Feb. 28, 1950     H. S. PHELAN     2,498,767
GEARING FOR DRIVING COAXIAL SHAFTS
Filed June 19, 1944     3 Sheets-Sheet 1
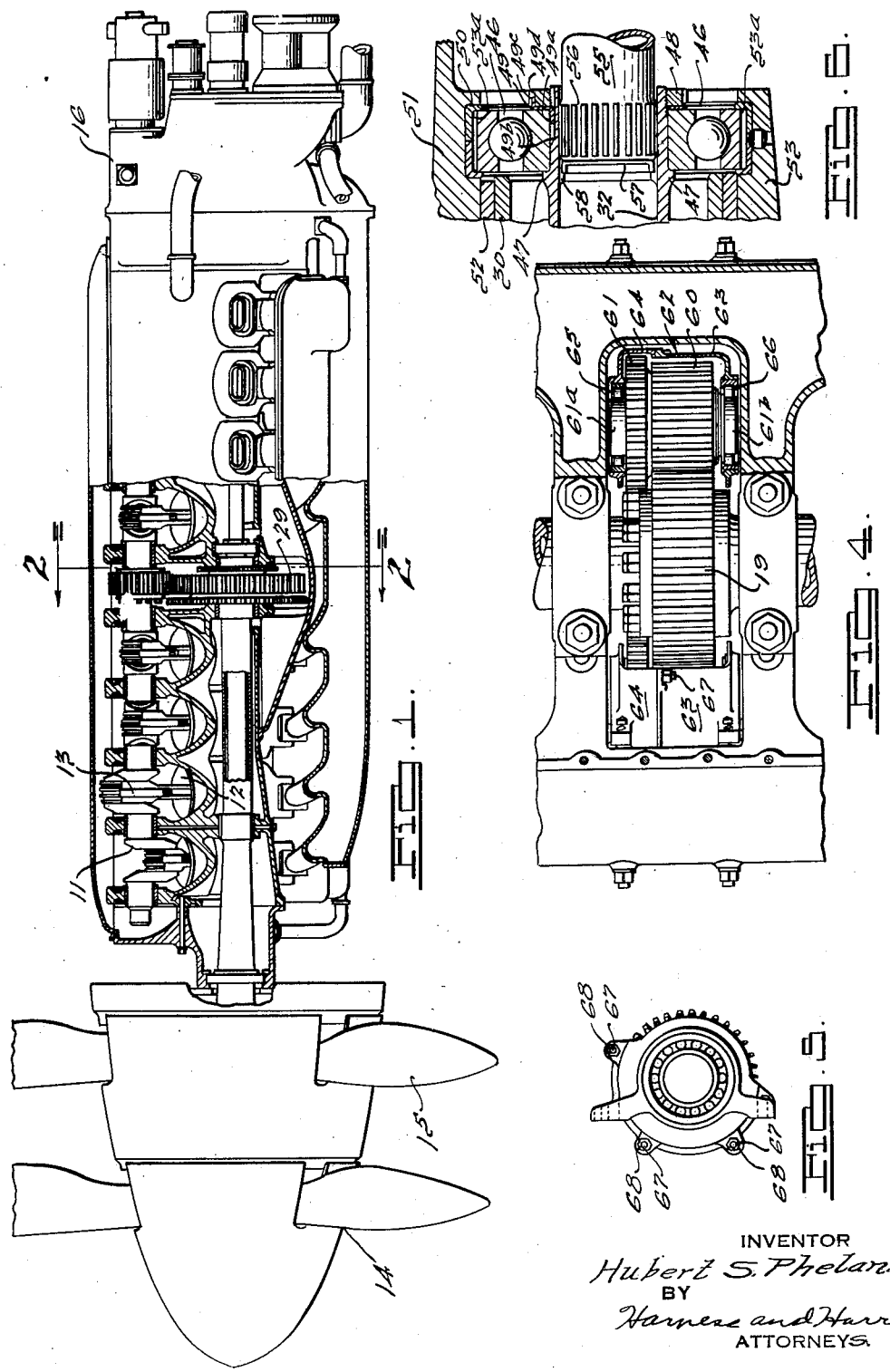
INVENTOR
Hubert S. Phelan.
BY
Harness and Harris
ATTORNEYS Feb. 28, 1950 H. S. PHELAN 2,498,767
GEARING FOR DRIVING COAXIAL SHAFTS
Filed June 19, 1944 3 Sheets-Sheet 2
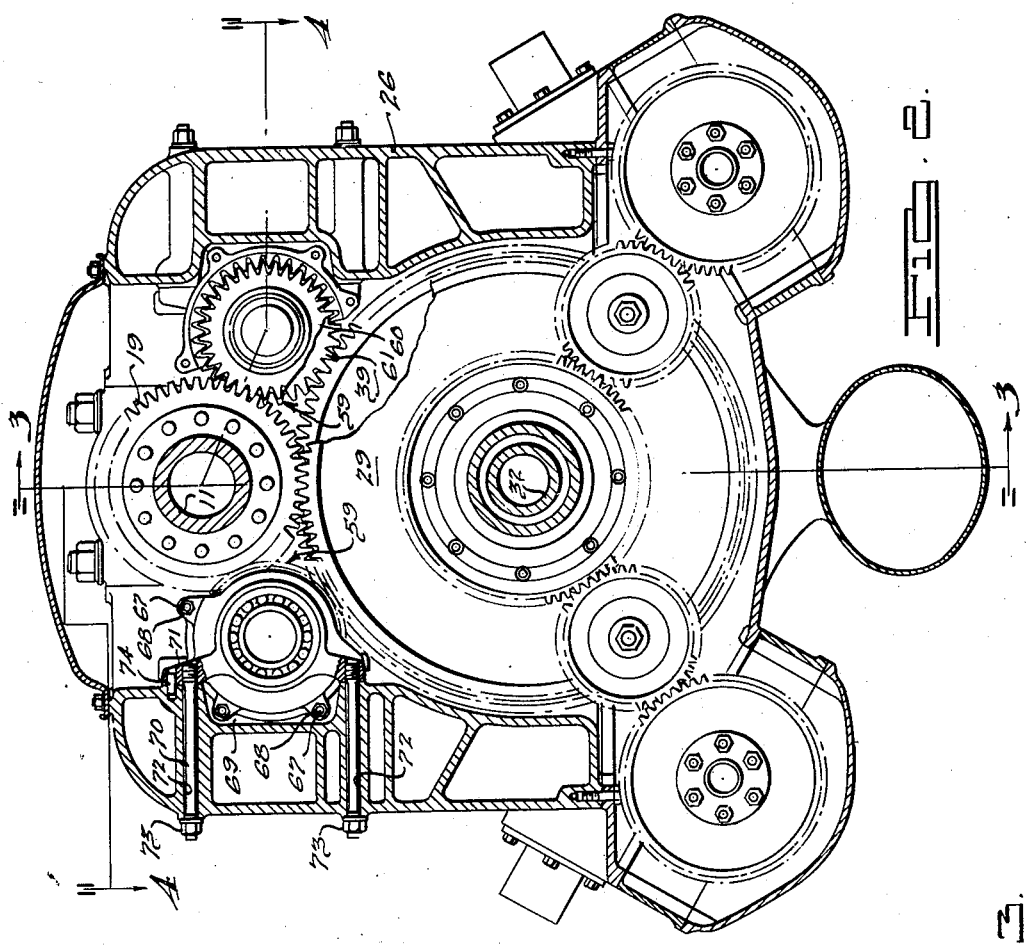
INVENTOR
Hubert S. Phelan.
BY
Harness and Harris
ATTORNEYS.

Feb. 28, 1950 H. S. PHELAN 2,498,767
GEARING FOR DRIVING COAXIAL SHAFTS
Filed June 19, 1944 3 Sheets-Sheet 3
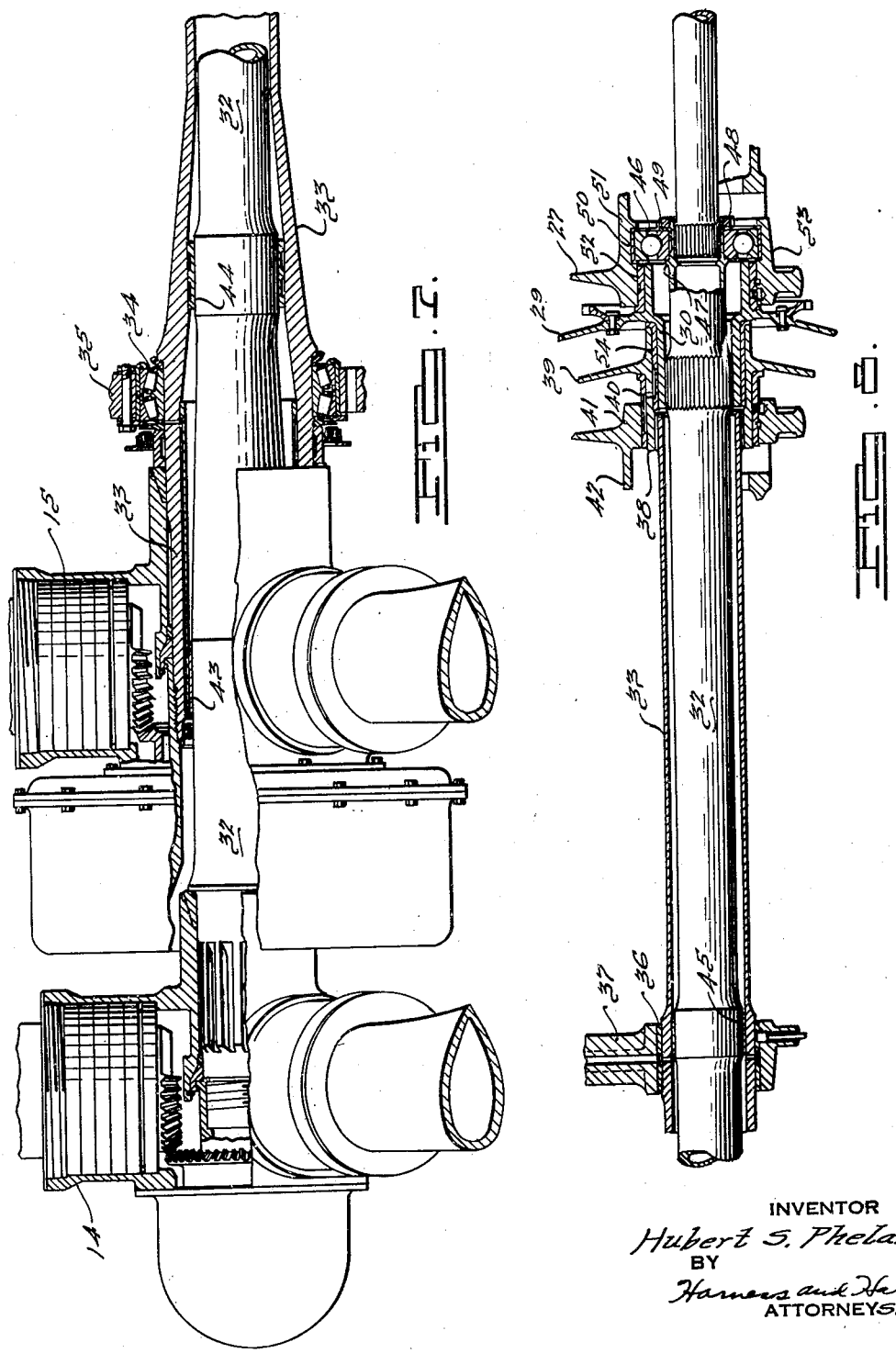
INVENTOR
Hubert S. Phelan.
BY
Harness and Harris
ATTORNEYS.

Patented Feb. 28, 1950

2,498,767

UNITED STATES PATENT OFFICE 2,498,767

GEARING FOR DRIVING COAXIAL SHAFTS

Hubert S. Phelan, Berkley, Mich., assignor to Chrysler Corporation, Highland Park, Mich., a corporation of Delaware Application June 19, 1944, Serial No. 540,926

14 Claims. (Cl. 74—665)

This application relates to a drive-transmitting means and to associated parts. More specifically it relates to a drive-transmitting means that may conveniently be mounted in an airplane engine adapted to drive oppositely rotating propellers.

The use of two oppositely rotating propellers with an airplane is well known, and the details of operation and the advantages need not be discussed here. The drive is, of course, somewhat complicated, because the propellers rotate in the opposite direction. Patent No. 2,442,838, issued June 8, 1948, discloses a certain arrangement of parts involving the transmission of drive from an engine crankshaft to telescoping shafts connected with the propellers. I have invented a certain portion of this arrangement by which the drive is transmitted as well as a novel bearing arrangement, which may be used for taking the axial thrust of one of the telescoping shafts.

An object of the present invention to provide improvements in drive-transmitting means adapted to be used between an engine crankshaft and one of a pair of oppositely rotating propellers.

A further object is the provision of an improved mode of mounting drive-transmitting parts in an engine. The mounting of these parts is removable, and the arrangement is such that the drive-transmitting parts themselves are not directly mounted or journalled in the engine.

Another object is to provide an improved bearing construction for use with a pair of telescoping shafts. These telescoping shafts may be employed in the transmission of drive from an engine crankshaft to oppositely rotating propellers.

Other objects will appear from the disclosure.

In the drawings:

Fig. 1 is a side view, partially in section, of an airplane engine embodying the novel features of the present invention;

Fig. 2 is a sectional view taken on the line 2—2 of Fig. 1;

Fig. 3 is a sectional view taken on line 3—3 of Fig. 2 and shows in detail a portion of structure in Fig. 1;

Fig. 4 is a sectional view taken on line 4—4 of Fig. 2;

Fig. 5 is a detail view of a novel removable drive unit of the present invention;

Fig. 6 is a sectional view showing a novel bearing of the present invention shown as a portion of the structure shown in Fig. 3;

Fig. 7 is a longitudinal sectional view showing the attachment of propellers to telescoping shafts; and Fig. 8 is a longitudinal sectional view showing the journalling of the telescoping shafts.

Shown in Figure 1 is an in-line engine which embodies the novel features of the present invention. The engine includes a crankshaft 11 and two V-arranged banks of cylinders, of which only one bank is shown in Fig. 1. Pistons 12 are mounted in the cylinders and are connected with the crankshaft 11 by connecting rods 13 at spaced points along the length thereof so as to deliver power thereto for rotation of the crankshaft. Positioned at one end of the engine is a pair of propellers 14 and 15 adapted to rotate in opposite directions. Each propeller is composed of a plurality of blades, which may conveniently be three in number spaced 120° apart, although for each propeller only two blades are shown. At the opposite end of the engine is positioned a supercharger 16, which is adapted to supply the engine with air or air and fuel in a compressed state.

As seen in Fig. 3, the crankshaft 11 is formed in sections 17 and 18, secured in spaced end-to-end relation at opposite sides of a driving gear 19 by means of screws 20 and nuts 21. The ends of the crankshaft sections 17 and 18 adjacent the driving gear 19 are supported in bearings 22 and 23. The bearing 22 is integral with webs or walls 24 and 25 forming part of an engine casing 26 (Fig. 2), and the bearing 23 with webs or walls 27 and 28 forming part of the engine casing. The driving gear 19 meshes with a wide driven gear 29 having a hub 30 having internal splines engaging external splines 31 formed on shaft 32. Shaft 32 and shaft 33 surrounding shaft 32 comprise a pair of telescoping shafts that drive the propellers 14 and 15, the inner shaft 32 driving the propeller 14 and the outer shaft 33 driving the propeller 15. Fig. 7 illustrates this. The forward end of the shaft 33, or the end adjacent the propeller 15, is supported in a thrust bearing 34 of the type having conical roller bearings. The bearing 34 is mounted in a front wall 35 of the engine casing 26. The outer shaft 33 is supported at an intermediate point on a bearing 36 in an intermediate wall 37 of the engine casing 26. On the rear end of the shaft 33 is splined a hub 38 of a narrow driven gear 39, and the hub is journalled in a bearing 40 mounted in a support 41 integrally joined to the wall 25 and to a wall 42 joined with the wall 24. Thus the bearing 40 provides support for the rear end of the shaft 33. The forward end of the inner shaft 32 is journalled in a sleeve 43 carried in the forward end of the outer shaft 33. The inner shaft 32 is also supported near its forward end on the outer shaft 33 by means of a bearing 44 mounted in the outer shaft. The inner shaft is also journalled at the wall 37 on a bearing 45 mounted in the outer shaft. The rear end of the inner shaft 32 extends beyond the rear end of the outer shaft 33 and is journalled in a thrust bearing 46 of the ball-bearing type, as shown in Fig. 6. The bearing 46 abuts an external shoulder 47 on the shaft 32 and is retained thereagainst by a collar 48 threaded on the shaft 32. A ring 49 locks the collar 48 against unthreading from the end of the shaft 32. The ring has a tab 49$^a$ fitting in a groove 49$^b$ in the shaft 32, thereby keying the ring to the shaft. After the collar 48 is threaded in place against the ring 49, one of a plurality of spaced tabs 49$^c$ on the ring is bent over into a groove 49$^d$ formed in the collar 48, thereby keying the collar to the ring. The bearing 46 is mounted in a two-part flanged ring 50 carried in a support 51 integral with the walls 27 and 28. Also mounted in the support 51 is a bearing 52 journalling the hub 30 of the wide driven gear 29. A cap 53 retains both the bearing 46 and the bearing 52 in place on the support 51. As seen in Fig. 6, there is peripheral clearance indicated at 53$^a$ between the ring 50 and the outer race of the bearing 46, and thus the bearing 46 takes axial thrust only imposed on the shaft 32. Lateral thrust on the shaft 32 is taken by the bearing 52 and by a bearing sleeve 54, positioned between the hubs of the gears 29 and 39. The rear end of the shaft 32 carries within it the end of a shaft driving the supercharger 16. The shaft 55 has external splines 56 engaging internal splines on the shaft 32. Movement of the shaft 55 to the left as viewed in Fig. 6 is limited by a shallow cup 57 press-fitted in a shouldered ring 58 positioned in the end of the shaft 32.

As seen in Fig. 2, the narrow driven gear 39 is drivingly connected with the driving gear 19 by means of a pair of idler gears 59 on opposite sides of an imaginary plane, which may be designated by the section line 3—3, containing the axes of the crankshaft 11 and the telescoping shafts 32 and 33. The idler gears form parallel paths for the transmission of drive from the driving gear 19 to the narrow driven gear 39. As seen in Figs. 2 and 4, each idler gear 59 comprises a wide gear section 60 and a narrow gear section 61 joined by flexible means, not shown, that is disclosed in the aforementioned Butterfield patent and is claimed therein. The wide section of each gear 59 meshes with the driving gear 19, and the narrow section, with the narrow driven gear 39. The gear 39 and the gear section 61 are, respectively, bigger in diameter than the gear 29 and the gear section 60, and thus the gear 39 and the gear section 61 may be in mesh without the gear 29 and the gear section 60 interfering or being in mesh.

Each idler gear 59 is contained in a housing 62 formed of mating parts 63 and 64. The section 61 of the idler gear has a short hub 61$^a$ journalled in the housing part 64 by means of a roller bearing 65 and a long hub 61$^b$ journalled in the housing part 63 by means of a roller bearing 66. The gear section 60 is keyed on the long hub 61$^b$ of the gear section 60. The housing parts are secured to one another by screws 67 threaded into the housing part 64 and extending through the housing part 63 and nuts 68 on the ends of the screws. Each housing 62 and its associated idler gear 59 is removably mounted in an interior recess 69 in the engine casing 26 by means of screws 70 having their inner ends in threaded engagement with threaded holes in bosses 71. The screws 70 extend through openings 72 in the casing 26, and their outer ends protrude from the outside of the engine casing. Nuts 73 are threaded on the outer ends of the bolts 70 against the outside of the engine casing to cause the bolts 70 to draw the housing 62 securely against the inside of the engine casing. Each housing 62 is located in the engine casing 26 by means of pins 74 extending through bosses 71 into the engine casing.

I claim:

1. In combination, a casing, a driving shaft mounted in the casing, and a driving gear mounted on the driving shaft, and a driven gear positioned within the casing, and a unit removably mounted in the casing for establishing drive between the gears, said unit comprising gear means including flexibly connected gear members meshing with the aforesaid gears and a housing journalling the gear means and extending partially into an interior recess in the casing and being open at one side to provide access of the gear means to the driving and driven gears and fastening elements for securing the unit in the casing and extending to the exterior of the casing.

2. In combination, a casing, a driving shaft mounted in the casing, and a driving gear mounted on the driving shaft, and a driven gear positioned within the casing, and a unit removably mounted in the casing for establishing drive between the gears, said unit comprising gear means including flexibly connected gear elements meshing with said driving gear and the other with said driven gear, and a housing formed in halves journalling the ends of the gear means and being open at one side to provide access of the gear means to the driving and driven gears and fastening elements being insertable endwise from the exterior of the casing into securing engagement with the housing and being securable to the exterior of the housing.

3. In combination, a casing, a driving shaft mounted in the casing, and a driving gear mounted on the driving shaft, and a driven gear positioned within the casing, a pair of units removably mounted in the casing for establishing parallel paths of drive from the driving gear to the driven gear, each unit comprising gear means including flexibly connected driving and driven gear elements meshing respectively with said driving and driven gears and a housing for the gear means, and means mounting the units at opposite sides of the interior of the casing.

4. In combination, a casing, a driving shaft mounted in the casing, and a driving gear mounted on the driving shaft, and a driven gear positioned within the casing, a pair of units removably mounted in the casing for establishing parallel paths of drive from the driving gear to the driven gear, each unit comprising gear means including flexibly connected driving and driven gear elements meshing respectively with said driving and driven gears and a housing for the gear means, and fastening elements insertable from the outside of the casing into securing engagement with the housing and being securable to the outside of the casing.

5. In combination, a casing, a driving shaft mounted in the casing, and a driving gear mounted on the driving shaft, and having a gear face of a predetermined width, a pair of telescoping shafts adapted to rotate coaxially in opposite directions about an axis in spaced parallelism to said driving shaft, first and second driven gears mounted respectively on the telescoping shafts and in immediate adjacency to each other, the first of said driven gears having a gear face of said predetermined width meshing coextensively with the gear face of said driving gear, the second of said driven gears having a gear face relatively narrower than said predetermined width and extending radially outwardly of the gear face of said first driven gear, a pair of units removably mounted in the casing for establishing parallel paths of drive from the driving gear to the second driven gear, each unit comprising flexibly connected gear sections, one said section having a gear face relatively narrower than said predetermined width engaging the said radially outer gear face of said driven gears, and the other said section having a gear face of said predetermined width and of less radial extent than the face of said one section for meshing coextensively with said driving gear in the plane of rotation with said first driven gear but being spaced from contact with the latter, and a housing journalling the gear sections, and means mounting the units in recesses at opposite sides of the interior of the casing and including fastening elements insertable through the casing from the outside to the inside into securing engagement with the housings and being securable to the outside of the casing.

6. In combination, a driving shaft, a pair of telescoping shafts adapted to rotate in opposite directions and to transmit drive at one end, the other end of the inner of the telescoping shafts projecting beyond the other end of the outer shaft, and means drivingly connecting the driving shaft and the telescoping shafts and including for the inner shaft a gear splined thereon at a region beyond the said other end of the outer shaft and adapted to take radial load of the said other end of the inner shaft and to be free of axial load of the inner shaft, means journalling the said gear for taking radial thrust imposed on the gear including that imposed by the said other end of the inner shaft upon the gear, and means acting on the said other end of the inner shaft beyond the gear so as to take the axial thrust imposed upon the inner shaft and yet to be free of radial load imposed upon the inner shaft.

7. In combination, a driving shaft, a pair of telescoping shafts adapted to rotate in opposite directions and to transmit drive at one end, the other end of the inner of the telescoping shafts projecting beyond the other end of the outer shaft, means drivingly connecting the driving shaft and the telescoping shafts and including first and second gears splined, respectively, on the said other end of the outer shaft and the said other end of the inner shaft and adapted to take the radial loads of the said other end of the outer shaft and the said other end of the inner shaft, respectively, and to be free of axial load of the outer shaft and axial load of the inner shaft, respectively, means journalling the second gear on the first gear for transmitting to the first gear the radial thrust imposed on the second gear including that imposed by the said other end of the inner shaft, means journalling the said one end of the outer shaft for taking the radial thrust imposed upon the said one end of the outer shaft and the axial thrust imposed upon the outer shaft, and means journalling the said other end of the inner shaft at a region beyond the gears so as to take the axial thrust imposed upon the inner shaft and yet to be free of radial load imposed upon the inner shaft.

8. In an assembly comprising a casing, a driving shaft mounted in the casing, and a driving gear having a gear face of a predetermined width and being mounted on the driving shaft, a pair of telescoping shafts adapted to rotate in opposite directions, and about an axis parallel to and spaced from said driving shaft, a first driven gear mounted on one of the telescoping shafts and presenting a gear face of said predetermined width for coextensively meshing with the driving gear, and a second driven gear mounted on the other of the telescoping shafts in juxtaposition to the first driven gear and having a gear face in radially jutting relation outward of the gear face of said first driven gear, the combination therewith of a unit removably mounted in the casing for establishing drive between the driving gear and the second driven gear, said unit comprising an intermediate gear formed for meshing with said gear face of the driving gear and said radially jutting gear face of the driven gears and a housing for the intermediate gear journalling the same.

9. In an assembly comprising a casing, a driving shaft mounted in the casing, and a driving gear mounted on the driving shaft and having a gear face of a predetermined width, a pair of telescoping shafts adapted to rotate in opposite directions, and about an axis parallel to and spaced from said driving shaft, a first driven gear mounted on one of the telescoping shafts and presenting a gear face of said predetermined width for coextensively meshing with the driving gear, and a second driven gear mounted on the other of the telescoping shafts in juxtaposition to the first driven gear and having a gear face in radially jutting relation outward of the gear face of said first driven gear, the combination therewith of a unit removably mounted in the casing for establishing drive between the driving gear and the second driven gear, said unit comprising an intermediate gear formed for meshing with said gear face of the driving gear and the said radially jutting gear face of the driven gears and a housing for the intermediate gear formed in complementary halves each journalling one end of the intermediate gear and being open at one side for providing access of the intermediate gear to the driving gear and the second driven gear.

10. In an assembly comprising a casing, a driving shaft mounted in the casing, and a driving gear mounted on the driving shaft and having a gear face of a predetermined width, a pair of telescoping shafts adapted to rotate in opposite directions, and about an axis parallel to and spaced from said driving shaft, a first driven gear mounted on one of the telescoping shafts and presenting a gear face of said predetermined width for coextensively meshing with the driving gear, and a second driven gear mounted on the other of the telescoping shafts in juxtaposition to the first driven gear and having a gear face in radially jutting relation outward of the gear face of said first driven gear, the combination therewith of a unit removably mounted in the casing for establishing drive between the driving gear and the second driven gear, said unit comprising an intermediate gear formed for meshing with said gear face of the driving gear and said radially jutting gear face of the driven gears and a housing for the intermediate gear journalling the same, and means for detachably mounting the unit in the casing comprising screws projecting from the exterior of the casing through the casing to the housing and having ends having threaded engagement with the housing.

11. In an assembly comprising a casing, a driving shaft mounted in the casing, and a driving gear mounted on the driving shaft, and having a gear face of a predetermined width, a pair of telescoping shafts adapted to rotate in opposite directions and about a common axis parallel to and spaced from said driving shaft, a first driven gear mounted on one of the telescoping shafts and presenting a gear face of said predetermined width for coextensively meshing with the driving gear, and a second driven gear mounted on the other of the telescoping shafts in juxtaposition to the first driven gear and having a gear face in radially jutting relation outward of the gear face of said first driven gear, the combination therewith of a unit removably mounted in the casing for establishing drive between the driving gear and the second driven gear, said unit comprising an intermediate gear formed for meshing with said gear face of the driving gear and said radially jutting gear face of the driven gears, and a housing for the intermediate gear formed in complementary halves each journalling one end of the intermediate gear and being open at one side for providing access of the intermediate gear to the driving gear and the second driven gear, and means for detachably mounting the unit in the casing comprising screws projecting from the exterior of the casing through the casing to the housing and having ends having threaded engagement with the housing and nuts having threaded engagement with screws outside the casing.

12. In an assembly comprising a casing, a driving shaft mounted in the casing, and a driving gear having a gear face of predetermined width and being mounted on the driving shaft, a pair of coincident telescoping shafts paralleling said driving shaft and adapted to rotate in opposite directions, a first driven gear mounted on one of the telescoping shafts and presenting a gear face of the same predetermined width as said driving gear for coextensively meshing with the driving gear, and a second driven gear mounted on the other of the telescoping shafts immediately contiguous to said first driven gear and having a face spaced radially outward of the gear face of said first driven gear, the combination therewith of a pair of units removably mounted in the casing for establishing parallel paths of drive between the driving gear and the second driven gear, each unit comprising flexibly connected gear sections one said section presenting a gear face of the same predetermined width as said driving gear and meshing axially coextensively with the driving gear and adjacent but in non-contacting spacing to said first driven gear and the other said section meshing with the second driven gear and a housing for the gear sections journalling the same.

13. In an assembly comprising a casing, a driving shaft mounted in the casing, and a driving gear having a gear face of predetermined width and being mounted on the driving shaft, a pair of coincident telescoping shafts paralleling said drive shaft and adapted to rotate in opposite directions, a first driven gear mounted on one of the telescoping shafts and presenting a gear face of the same predetermined width as said gear for coextensively meshing with the driving gear, and a second driven gear mounted on the other of the telescoping shafts immediately contiguous to said first driven gear and having a gear face spaced radially outward of the gear face of said first driven gear, the combination therewith of a pair of units removably mounted in the casing for establishing parallel paths of drive between the driving gear and the second driven gear, each unit comprising flexibly connected gear sections one said section presenting a gear face of the same predetermined width as said driving gear and meshing axially coextensively with the driving gear and adjacent but in non-contacting spacing to said first driven gear and the other said section meshing with the second driven gear, and a housing for the gear sections journalling the same, and means for detachably mounting the units in the casing comprising a first set of screws projecting interiorly from one side of the casing and having ends in threaded engagement with the one housing and a second set of screws projecting interiorly from the other side of the casing and having ends in threaded engagement with the other housing.

14. In an assembly comprising a casing, a driving shaft mounted in the casing, and a driving gear having a face of predetermined width and being mounted on the driving shaft, a pair of coincident telescoping shafts paralleling said driving shaft and adapted to rotate in opposite directions, a first driven gear mounted on one of the telescoping shafts and presenting a gear face of the same predetermined width as said driving gear for coextensively meshing with the driving gear, and a second driven gear mounted on the other of the telescoping shafts immediately contiguous to said first driven gear and having a gear face spaced radially outward of the gear face of said first driven gear, the combination therewith of a pair of units removably mounted in the casing for establishing parallel paths of drive between the driving gear and the second driven gear, each unit comprising flexibly connected gear sections one said section presenting a gear face of the same predetermined width as said driving gear and meshing axially coextensively with the driving gear and adjacent but in non-contacting spacing to said first driven gear and the other said section with the second driven gear and a housing for the gear sections journalling the same, and means for detachably mounting the unit in the engine casing comprising a first set of screws projecting through one side of the casing into threaded engagement at one end with one housing and exteriorly of the casing at the other end, a second set of screws projecting through the other side of the casing into threaded engagement with the other housing at one end and exteriorly of the casing at the other end, and nuts engaging the said other ends of the screws exteriorly of the casing.

HUBERT S. PHELAN.

REFERENCES CITED

The following references are of record in the file of this patent:

UNITED STATES PATENTS

| Number | Name | Date |
|---|---|---|
| 609,664 | Dibble | Aug. 23, 1898 |
| 1,412,430 | Verneuil | Apr. 11, 1922 |
| 1,634,017 | Cappa | June 28, 1927 |

(Other references on following page)

UNITED STATES PATENTS

| Number | Name | Date |
|---|---|---|
| 1,664,492 | Smith et al. | Apr. 3, 1928 |
| 1,814,802 | Herr | July 14, 1931 |
| 1,889,305 | Zerbi | Nov. 29, 1932 |
| 2,050,283 | Dixon | Aug. 11, 1936 |
| 2,065,753 | Schmitter et al. | Dec. 29, 1936 |
| 2,165,453 | Chilton et al. | July 11, 1939 |
| 2,185,545 | Egan | Jan. 2, 1940 |
| 2,201,893 | Gadoux et al. | May 21, 1940 |
| 2,216,013 | Kenney | Sept. 24, 1940 |
| 2,232,683 | Lloyd | Feb. 25, 1941 |
| 2,305,454 | Nallinger et al. | Dec. 15, 1942 |
| 2,319,146 | Mansell et al. | May 11, 1943 |
| 2,347,906 | Hatcher | May 2, 1944 |
| 2,350,377 | Tjaarda | June 6, 1944 |
| 2,392,015 | Ware | Jan. 1, 1946 |

FOREIGN PATENTS

| Number | Country | Date |
|---|---|---|
| 201,398 | Netherlands | Feb. 16, 1939 |
| 508,501 | Great Britain | June 30, 1939 |
| 541,820 | Great Britain | Dec. 12, 1941 |
| 543,851 | Great Britain | Mar. 16, 1942 |
| 831,325 | France | June 7, 1938 |